United States Patent [19]

Hasegawa et al.

[11] Patent Number: 5,032,993
[45] Date of Patent: Jul. 16, 1991

[54] CONTROL FOR AN AUTOMATIC TRANSMISSION

[75] Inventors: Hiromi Hasegawa, Obu; Toshiaki Ishiguro, Nagoya, both of Japan

[73] Assignee: Aisin Seiki Kabushiki Kaisha, Kariya, Japan

[21] Appl. No.: 275,919

[22] Filed: Nov. 25, 1988

[30] Foreign Application Priority Data

Nov. 24, 1987 [JP] Japan .................................. 62-294229

[51] Int. Cl.⁵ .......................... B60K 41/08; G06F 15/20
[52] U.S. Cl. .................................... 364/424.1; 74/866
[58] Field of Search ............... 364/424.1; 74/866, 867, 74/868, 869, 877, 862; 192/0.044, 3.31

[56] References Cited

U.S. PATENT DOCUMENTS

| | | | |
|---|---|---|---|
| 4,208,925 | 6/1980 | Miller et al. | 74/866 |
| 4,618,041 | 10/1986 | Sotoyama et al. | 192/0.044 |
| 4,640,394 | 2/1987 | Higashi et al. | 192/3.31 |
| 4,643,048 | 2/1987 | Hattori et al. | 364/424.1 |
| 4,669,335 | 6/1987 | Matsuoka et al. | 74/866 |
| 4,694,709 | 9/1987 | Kikuchi et al. | 364/424.1 |
| 4,753,134 | 6/1988 | Hayasaki | 364/424.1 |
| 4,753,135 | 6/1988 | Sotoyama et al. | 74/866 |
| 4,783,743 | 11/1988 | Yashiki et al. | 364/424.1 |
| 4,843,909 | 7/1989 | Hasegawa et al. | 74/862 |
| 4,858,501 | 8/1989 | King | 74/868 |

Primary Examiner—Felix D. Gruber
Attorney, Agent, or Firm—Burns, Doane, Swecker & Mathis

[57] ABSTRACT

An automatic transmission is controlled by detecting engine rmp following a transmission downshift and comparing the detected engine speed with a predetermined speed value. If the detected speed does not exceed the predetermined value, the solenoids controlling the down-shift are maintained energized. If the detected speed exceeds the predetermined speed value, the solenoids are de-energized to prevent overrunning of the engine.

7 Claims, 7 Drawing Sheets

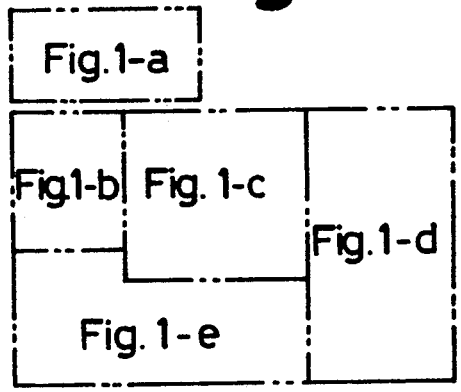
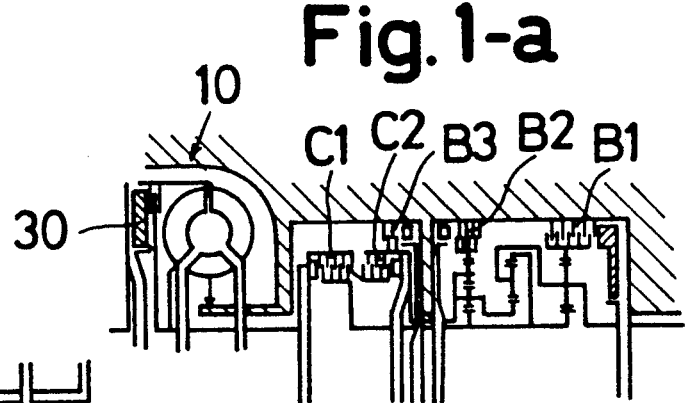
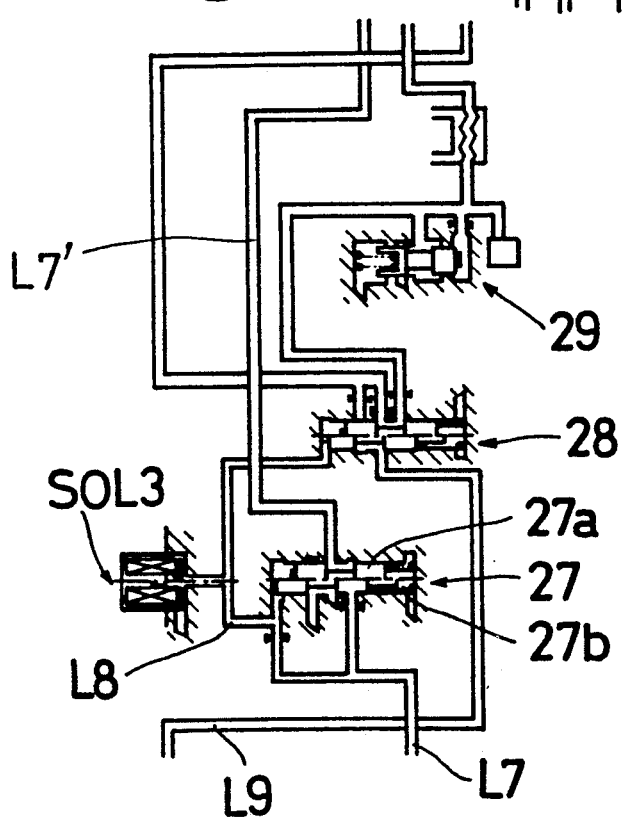

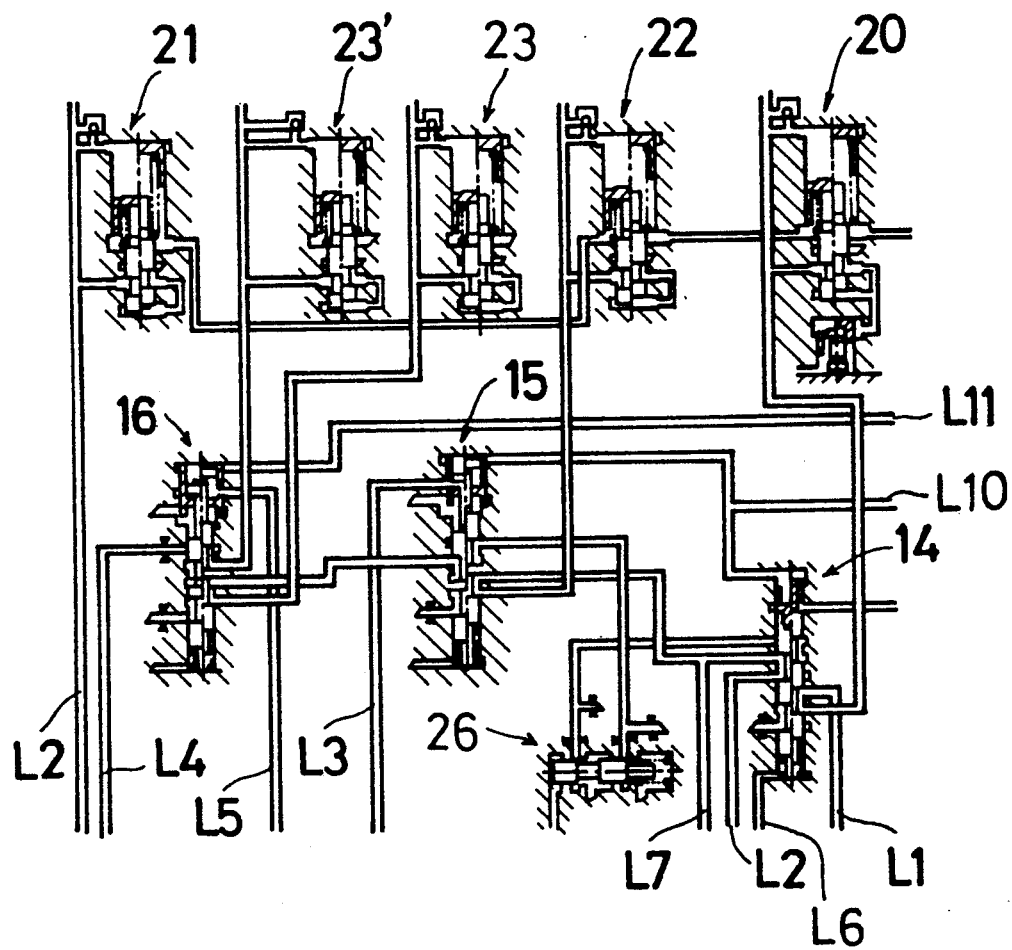
Fig. 1-c

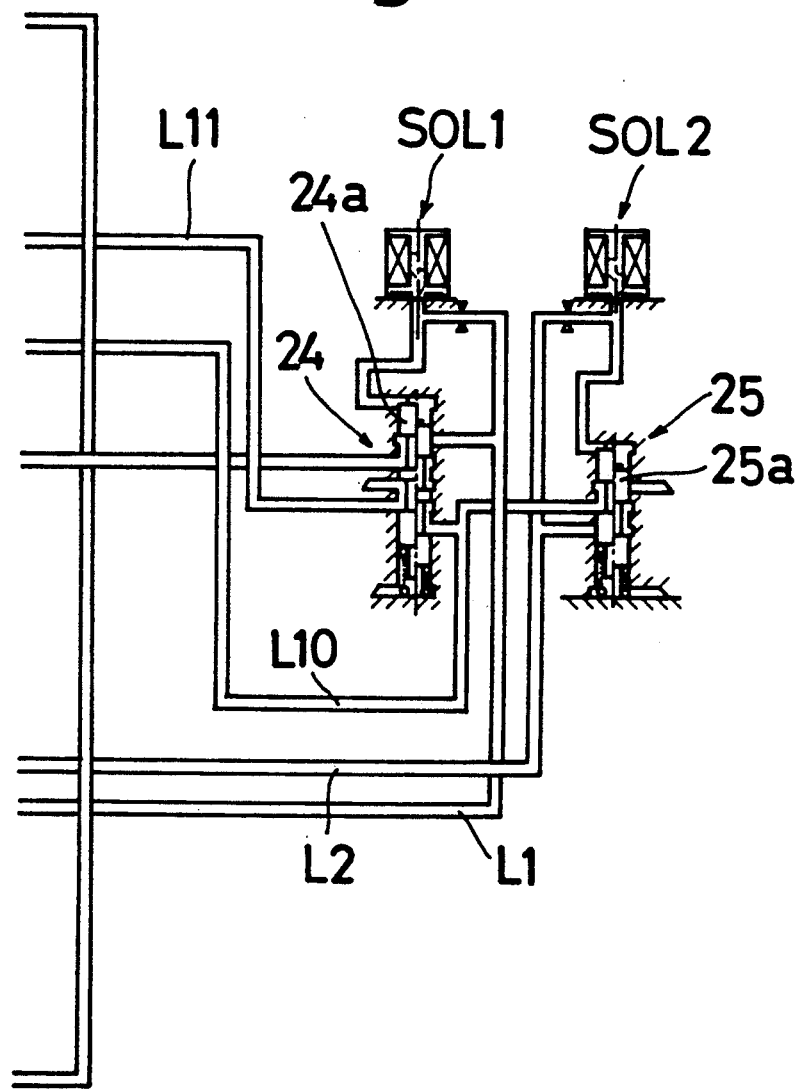
Fig. 1-d

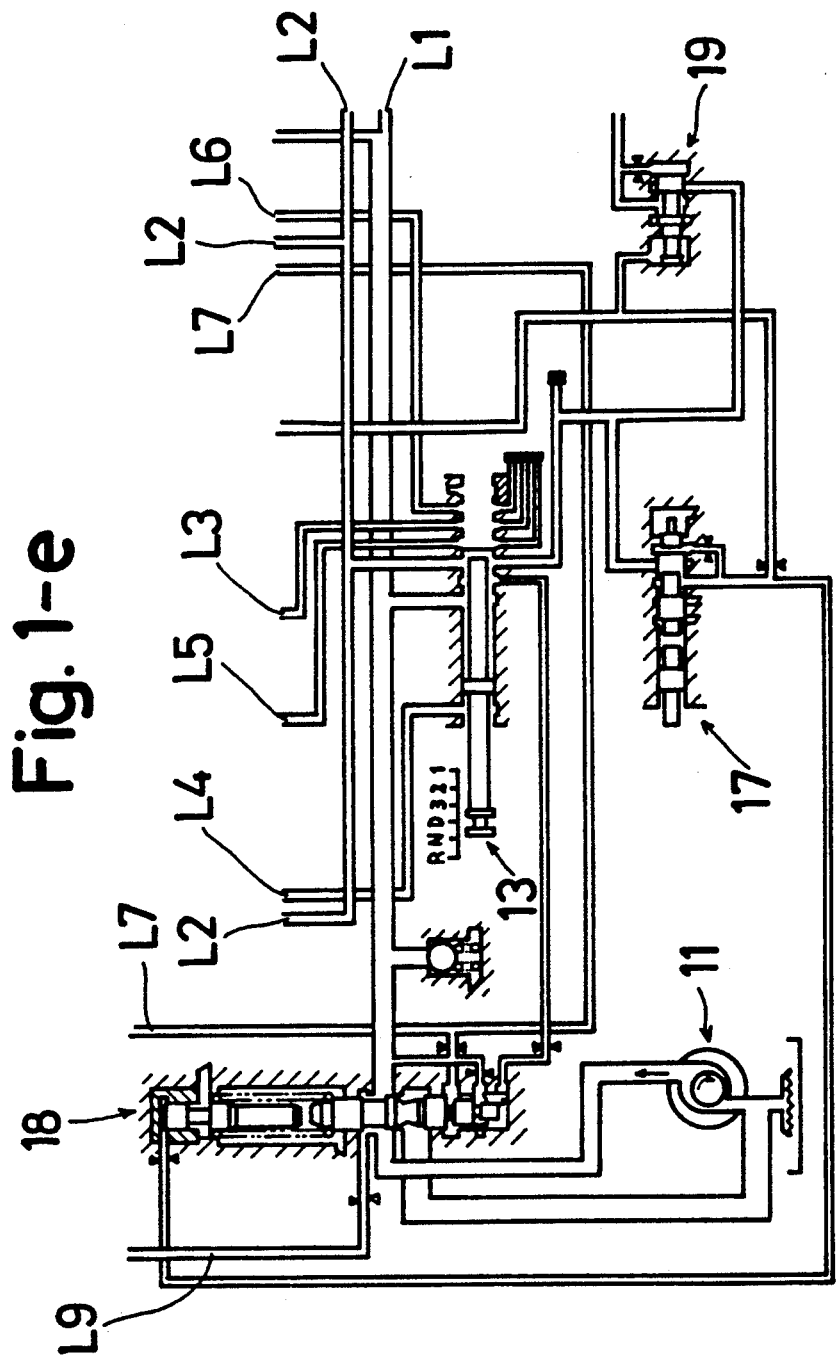

CONTROL FOR AN AUTOMATIC TRANSMISSION

BACKGROUND OF THE INVENTION

1. Field of the Invention

This invention relates to an automatic transmission control. The control is used in connection with a solenoid valve which accomplishes gear ratio stages. More particularly, the control method is useful for a full automatic electronic controlled transmission.

2. Description of the Prior Art

A conventional electronic controlled transmission is disclosed, for example, in Japanese Laid-Open Publication No. 60-30864 (TOKU-KAI-SYO 60-30864), issued on Feb. 16, 1985.

FIG. 4 of the accompanying drawing shows a conventional type of a solenoid valve 100 for use in such a transmission, the solenoid valve comprising an electromagnetic coil 101, a core 102 and a plunger 103. An electronic controlled transmission is equipped with a plurality of those conventional solenoid valves which establish a plurality of gear ratio stages in connection with an operation of a manual shift valve.

As seen from FIG. 4, there is a clearance 104 between the core 102 and the plunger 103. A spring 105 is provided between the core 102 and the plunger 103 which produces a proper tension to bias the plunger 103 away from the core. An inlet oil conduit 106 is connected to an inlet port 107 of the solenoid valve 100. An outlet oil conduit 108 is formed in the solenoid valve 100.

The above mentioned solenoid valve is a normally closed type of solenoid valve. When the solenoid valve 100 is magnetized, the plunger approaches the core whereupon the inlet conduit 106 and the outlet conduit 108 are communicated with each other. On the other hand, when the solenoid valve 100 is demagnetized, the spring extends the plunger so that the inlet conduit 106 and the outlet conduit 108 are not communicated with each other.

During the operation of the electric controlled transmission, if trash invades the clearance 104 of the solenoid valve 100, the operation of the solenoid valve 100 may be interrupted. This operating condition is called "solenoid-stick" which obstructs the operation of the electronic controlled transmission and can result in the engine overrunning, especially if the transmission had been signalled to down-shift when the solenoid-stick occurred.

SUMMARY OF THE INVENTION

It is an object of this invention to provide a control method for an automatic transmission in which the above mentioned drawback of the conventional apparatus is eliminated.

It is a further object of this invention to provide a control method for an automatic transmission in which the overrunning of an engine can be prevented despite the sticking of a solenoid valve.

In accordance with the invention, when trash is accumulated in the clearance of a solenoid valve whereupon the operation of the solenoid valve is obstructed, a flow of electric current is cut off such that the plunger is returned to a closed state by the tension of a spring and overrunning of the engine is prevented.

BRIEF DESCRIPTION OF THE DRAWINGS

FIG. 1 is a schematic depiction of a hydraulic circuit diagram, portions of which are shown in FIG. 1a through FIG. 1e;

FIG. 1a is a partial circuit diagram of the hydraulic circuit of the automatic transmission according to claim 1;

FIG. 1b shows a partial circuit diagram illustrating a hydraulic circuit of an automatic transmission;

FIG. 1c shows a partial circuit diagram illustrating a hydraulic circuit of an automatic transmission;

FIG. 1d shows a partial circuit diagram illustrating a hydraulic circuit of an automatic transmission;

FIG. 1e shows a partial circuit diagram illustrating a hydraulic circuit of an automatic transmission;

Figure 2:
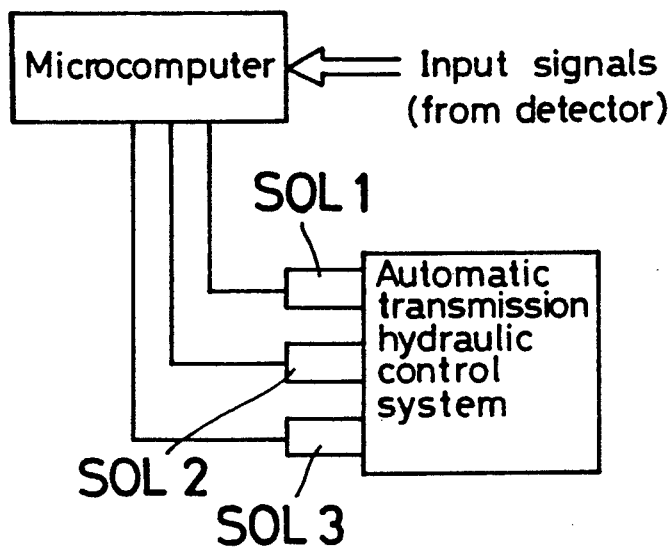
FIG. 2 shows a block diagram illustrating a system for controlling solenoid valves.

Table 1 shows a relation between the shift lever positions and the operation of the solenoid valve.

DETAILED DESCRIPTION OF THE PREFERRED EMBODIMENTS

Features and advantages of this invention will become apparent from the following description and the accompanying drawing.

With reference to FIG. 1a, a hydraulic circuit control system is associated with a torque converter 10 and gear change mechanism. FIG. 1b includes a lock-up control valve 27, a torque converter control valve 28 and a lubrication control valve 29. FIG. 1c includes a 1-2 shift valve 14, a 2-3 shift valve 16, a 3-4 shift valve 16; an accumulator valve 20 for brake B1, an accumulator valve 22 for brake B2, an accumulator valve 23 for clutch C2, an accumulator valve 21 for clutch C1, an accumulator valve 23' for clutch C2 and an exhaust control valve 26. FIG. 1d depicts a first signal valve 24, a second signal valve 25 and solenoid valves SOL1, SOL2, SOL3. FIG 1e depicts a hydraulic pump 11, a manual valve 13, a throttle valve 17, a primary regulator valve 18 and a throttle modulator valve 19.

In the hydraulic circuit of the automatic transmission of FIG. 1e, an oil line L1 extending from the hydraulic pump 11 via the primary regulator valve 18 is connected to the manual valve 13. The oil line L1 is connected to oil lines L2, L3, L4, L5,, L6 and L7 via the manual valve 13. The solenoid valves SOL1, SOL2, clutches C1, C2 and brakes B1, B2 and B3 are operated, as shown in Table 1 in accordance with shift lever positions R, N, D, 3, 2, and 1.

In FIG. 1b, the lock-up control valve 27 having a spool 27a is controlled by operation of the solenoid valve SOL3 located within the hydraulic circuit control system. A lock-up clutch 30 is activated in response to operation of the solenoid valve SOL3. More specifically, when the solenoid valve SOL3 is in a magnetized state, the oil line L8 is closed and the spool 27a is urged into the rightward direction by hydraulic pressure from the line L7, whereby lines L9 and L7' are brought into communication to supply pressurized oil that engages the lock-up clutch 30. When the solenoid valve SOL3 is in a demagnetized state, on the other hand, pressurized oil from the line L7 drains from the line L8, so that the spool 27a is held at its left side position in FIG. 1 by a spring 27b. As a result, the lines L9 and L7' are cut off from each other so that the lock-up clutch 30 is disengaged.

As seen from FIG. 1d, the first signal valve 24 is provided with a spool 24a and the pressurized oil supplied to the first signal valve 24 is transmitted to the 1-2 and 3-4 shift valves 14, 16. The first signal valve 24 is controlled by the operation of the spool 24a. The valve spool 24a is controlled by operation of the solenoid valve SOL1. When the solenoid valve SOL1 is in a demagnetized state, the oil line L1 communicates with an end of the spool 24a whereby the spool 24a is urged downwardly by hydraulic pressure from the line L1. A line L10 from the second signal valve 25 and a line L11 to the 3-4 shift valve 16 then communicate with each other. On the other hand, When the solenoid valve SOL 1 is in the demagnetized state, pressurized oil drains from the line L1, so that the spool 24a is held at its upward position by tension of a spring 24b of the first signal valve 24. The second signal valve 25 is provided with a spool 25a, and the pressurized oil supplied to the second signal valve 25 is transmitted to the first signal valve 24 which is controlled by the spool 25a of the second signal valve 25. The second signal valve 25 is controlled by operation of the solenoid valve SOL2. When the solenoid valve SOL2 is in the demagnetized state, the line L2 communicates with an end of the spool 25a and the spool 25a is urged downwardly by the hydraulic pressure from the line L2. The line L2 from the manual valve 13 and the line L!0 to first signal valve 24, 1-2 shift valve 14 and 2-3 shift valve 15 communicate with each other. On the other hand, when the solenoid valve SOL2 is in the demagnetized state, pressurized oil drains from the line L2, so that the spool 25a is held at its upward position by tension of a spring 25b of the second signal valve 25.

TABLE 1

| Manual Valve Operation | Various State of the Transmission | SOL1 | SOL2 |
|---|---|---|---|
| R | — | X | O |
| N | — | X | X |
| D | (4) | X | X |
|   | 3 | O | X |
|   | 2 | O | O |
|   | 1 | X | O |
| 3 | 3 | O | X |
|   | 2 | O | O |
|   | 1 | X | O |
|   | (3) | X | X |
| 2 | 2 | O | O |
|   | 1 | X | O |
|   | (2) | X | X |
| 1 | 1 | X | O |
|   | (1) | X | X |

Thus, the gear ranges in the automatic transmission are shifted by control based on operation of the two solenoid valves SOL1, SOL2, and the lock-up clutch 30 in engaged and disengaged by control based on operation of the solenoid valve SOL3. Table 1 shows a relationship between the solenoid valves SOL1 and SOL2 in the magnetized state and in the demagnetized state, which are controlled by the microcomputer 50.

The three solenoid valves SOL1, SOL2 and SOL3 are operated by the microcomputer 50, as shown in FIG. 2. The microcomputer 50 has its output side connected to the solenoid valves SOL1, SOL2 and SOL3 of the hydraulic control system, and controls these solenoid valves in response to input signals received from various sensors.

Figure 4:
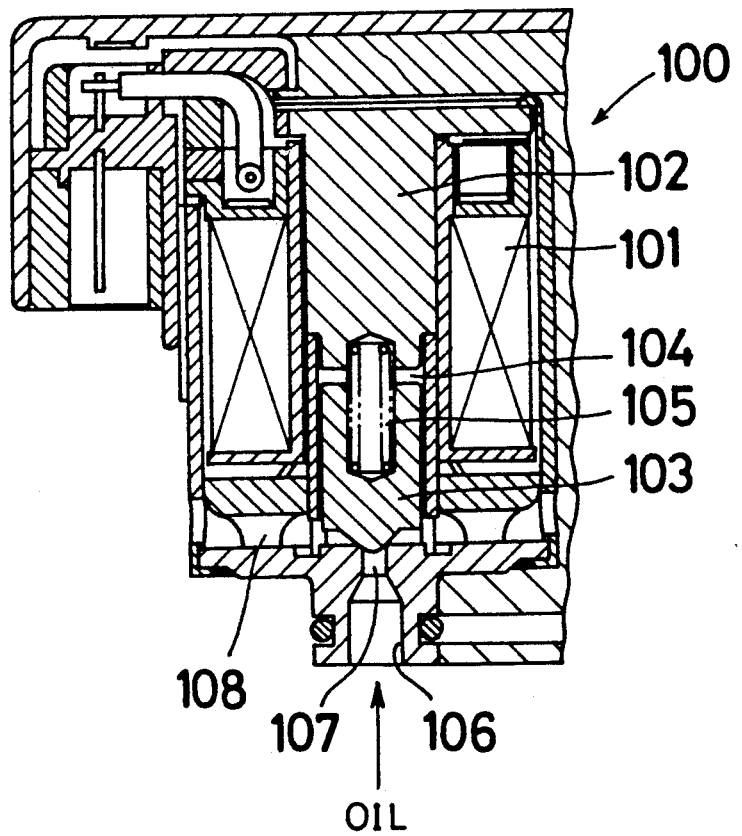
FIG. 4 is a longitudinal sectional view of a solenoid valve for an electronic controlled automatic transmission.

The solenoid valves SOL1, SOL2, and SOL3 are preferably of the type depicted in FIG. 4, the operation which was described earlier herein.

The control performed by the microcomputer 50 for establishing the various gear ranges in the automatic transmission will now be described with reference to a flow chart of FIG. 3.

Figure 3:
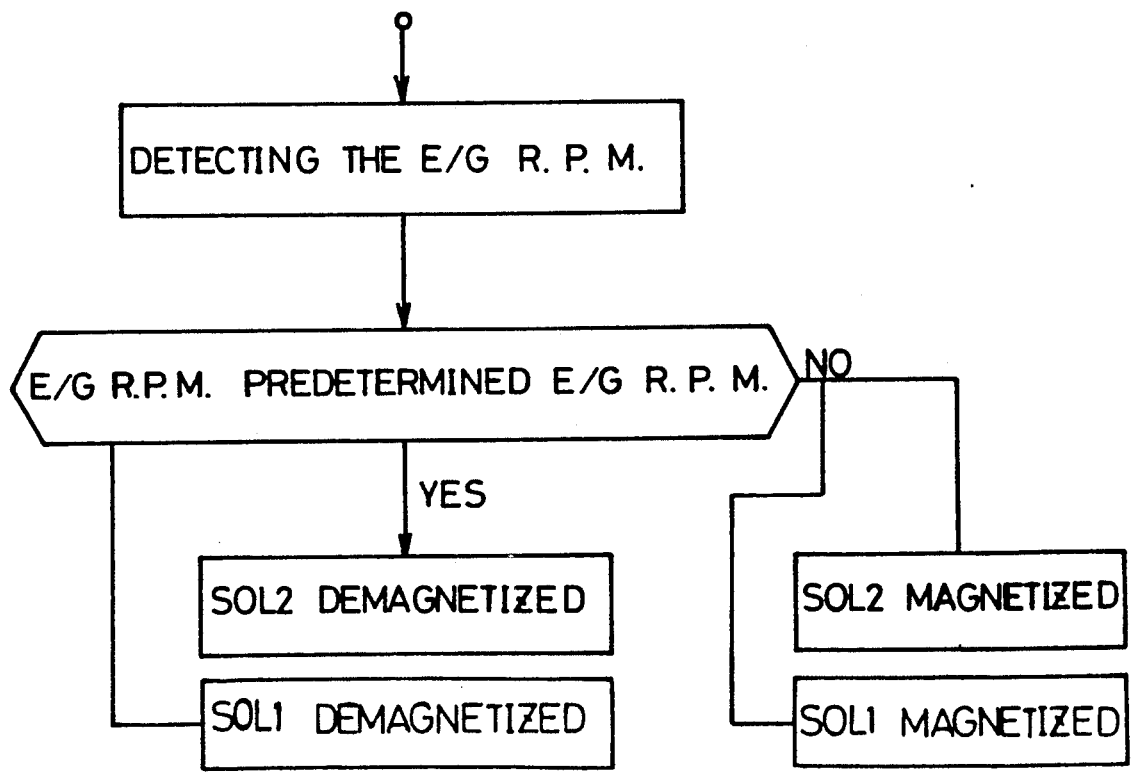
FIG. 3 shows a flow chart illustrating an embodiment of the control method according to this invention.

FIG. 3 explains the flow of a detected signal which is produced by engine operation. As shown in FIG. 3, a step (a) requires that the engine revolution per minute (engine RPM) be read while the engine is operated. This is followed by a step (b) wherein it is determined whether the engine RPM is higher than a predetermined engine RPM. If the answer is YES, (i.e., the engine RPM is higher than the predetermined engine RPM), an operational signal from the step (b) is generated for a step (c). If the answer is NO (i.e., the engine RPM is lower than the predetermined engine RPM), the operational signal from the step (b) is generated for a step (d). At the step (c), the electric current is not turned on or transmitted to the solenoid valve SOL2. At the step (d), the electric current is turned on or transmitted to the solenoid SOL2.

By turning off electric current to the solenoid SOL2 in that manner, the risk of the engine overrunning due to a solenoid-stick condition is prevented. That is, as described earlier herein, if trash enters a clearance 150 of either or both of solenoid valves SOL2, SOL3 (shown in FIG. 4 with respect to a solenoid valve 100), the operation of the solenoid valves SOL1 and SOL2 will be disturbed, since that trash causes "solenoid-stick". When the throttle valve 17 of the hydraulic circuit is operated to a full throttle position in response to a rapid depression of the accelerator pedal (not shown), a downshift is attained wherein the microcomputer 50 produces a shift control signal for solenoid valves SOL1 and SOL2. Under the "solenoid-stick" condition, however, the down shift control oversteps the predetermined shift position, whereupon the engine may overrun for a sufficient period of time to be damaged.

In this invention, when the detected rpm of the signal is higher than a predetermined level, the microcomputer produces a cut-off signal for the solenoid valves which return to the demagnetized position. This operation prevents the engine from overrunning for a time period greater than the time required for the microcomputer to produce the cut-off signal.

Figure 5:
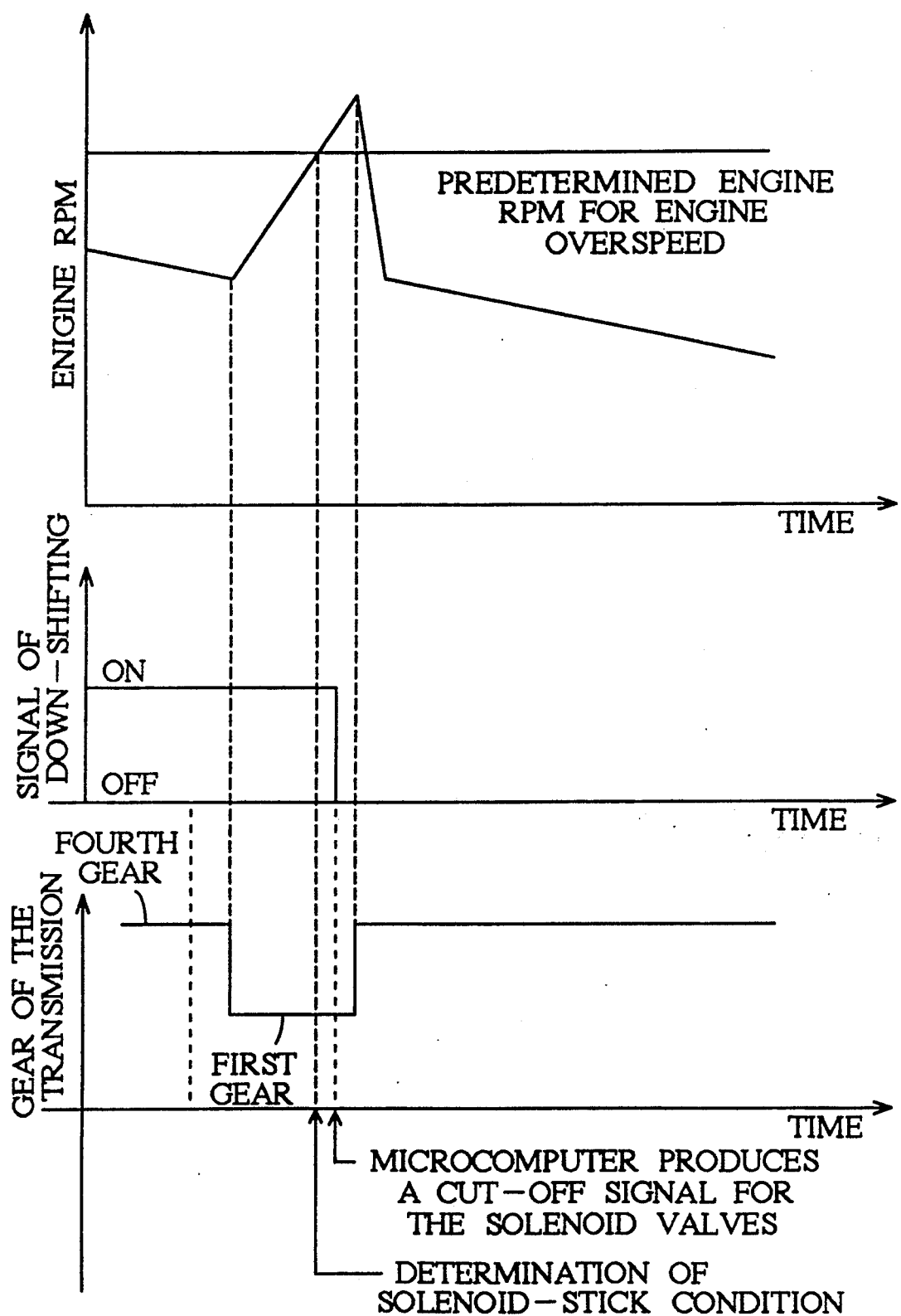
FIG. 5 illustrates the speed of an engine, the signal of down shifting and the gear change of the transmission all as a function of time.

For example, as illustrated in FIG. 5, if a vehicle operator traveling in fourth gear presses down on the accelerator to effect a down-shift condition, the solenoid valves SOL1 and SOL2 will be energized with the intention of down-shifting the transmission from fourth gear to second gear. However, if trash is present which prevents opening of a solenoid valve, the transmission will instead downshift to first gear which will result in an overrunning of the engine and possible damage to the engine. In accordance with the present invention, however, the condition wherein the engine rpm exceeds the predetermined engine rpm will be detected, whereupon the solenoid valves will be de-energized. As a result, the transmission will be returned to fourth gear, thereby avoiding damage to the engine.

While this invention has been described fully and completely with special emphasis upon a single preferred embodiment, it should be understood that within the scope of the appended claims the invention may be practiced otherwise than as specifically described herein.

What is claimed is:

1. In a computer controlled automatic transmission, a method to control engine overspeed in response to a downshift requesting the skipping of a gear ratio, the computer performing the steps of:

energizing solenoid valve means to effect a downshift of said transmission, detecting engine rotational speed following said energizing step, comparing said detected engine rotational speed with a predetermined speed value, and de-energizing said solenoid valve means if said detected engine speed exceeds said predetermined speed value, whereby the downshift is not executed and the transmission is returned to a higher gear ratio.

2. A method according to claim 1 wherein said downshifting is performed by first and second electric solenoid valves of said solenoid valve means.

3. A method according to claim 2 wherein the transmission is provided with a lock-up clutch and the lockup of the clutch is performed by a further electric solenoid valve.

4. A method according to claim 2, wherein said downshifting is under the control of manual shift means.

5. A method according to claim 1, further comprising the step of maintaining energization of said solenoid valve means if said detected engine speed does not exceed said predetermined speed value.

6. A control system for an automatic transmission for enabling down-shift and preventing an overspeed condition of an engine, said transmission comprising solenoid valve means for effecting a transmission down-shift, means for energizing said solenoid valve means in response to receiving a down-shift signal, means for detecting engine rotational speed following a transmission down-shift, means for comparing said detected engine speed with a predetermined engine speed value for de-energizing said solenoid valve means if said detected engine speed exceeds said predetermined speed value.

7. A control system according to claim 6, wherein said solenoid value means is maintained in an energized state when said detected engine speed does not exceed said predetermined speed value.

* * * * *